United States Patent Office 3,729,401
Patented Apr. 24, 1973

3,729,401
CALCIUM ION MEASURING ELECTRODE
Richard Elmond Cosgrove II, Leucadia, and Charles Arnold Mask, Garden Grove, Calif., assignors to Beckman Instruments, Inc.
No Drawing. Filed Mar. 1, 1972, Ser. No. 230,981
Int. Cl. G01n 27/30
U.S. Cl. 204—195 L                4 Claims

ABSTRACT OF THE DISCLOSURE

An electrode for measuring the concentration of calcium ions in an aqueous solution comprising a substantially water immiscible, liquid organic phase containing an ion exchange material selected from the group consisting of calcium bis [para(1,1,3,3 tetramethyl butyl)-phenyl] phosphate, calcium bis (para-t-butyl phenyl) phosphate, bis [para (1,1,3,3 tetramethyl butyl)-phenyl] phosphoric acid, and bis (para-t-butyl phenyl (phosphoric acid. Means are provided for containing the organic phase and providing an interface for ion exchange contact between the organic phase and the aqueous solution and an internal reference electrode element is also provided in electrical contact with the organic phase.

BACKGROUND OF THE INVENTION

The instant invention relates to specific or selective ion electrodes. It is particularly directed to an ion exchange material useful in such electrodes. Specific ion electrodes normally consist of a container formed for example of insulating glass or plastic tubing sealed across one end by a membrane of some type. The two desirably contains a solution of the ion to be measured and a calomel or silver-silver chloride internal reference electrode.

A voltmeter is used to measure the potential developed between specific ion electrode and an external reference electrode when the pair is immersed in a solution. The specificity or selectivity of the system depends upon the membrane or interfacial material. The membrane or interface functions as a barrier, allowing only the desired ion to pass by diffusion between the sample and the internal filling solution. The diffusion results from a difference in activity between the two solutions. When the activity of the ion in the sample solution exceeds that in the internal solution, there is a net diffusion of ions into the electrode. The transport of ions continues until a state of equilibrium is reached. The electric potential developed across the membrane prevents a further net diffusion of ions. The value of the membrane or interfacial potential varies with the concentration of the ion in the sample, as discussed in detail in Weber, "A Specific Ion Electrodes in Pollution Control," American Laboratory, July 1970, pp. 15–23.

Specific ion electrodes in general use today can be broadly divided into three different types. The first type is that known as the glass electrode type and the second type is the solid state precipitating electrode. A third type is commonly called the liquid-liquid membrane electrode.

The glass electrode is generally limited to the detection of hydrogen, hydroxyl, sodium, and potassium ions.

A solid state precipitate electrode generally has an inorganic crystal membrane. The membrane is a thin layer of a crystal that has a mobile ion in its lattice which is free to move from one vacant site to another.

Liquid-liquid membrane electrodes utilize liquid ion exchange membranes. These are typically composed of an inert porous plastic substrate saturated with a water immiscible organic solvent. A high molecular weight organic salt of the desired ion is dissolved in the solvent. The selectivity of these electrodes depends upon the ability of the organic groups to form a stable complex with the ions sought but not with other ions which may be present in the sample. A wide variety of electrodes may be prepared which fit the general category of a liquid-liquid membrane electrodes. Many of these, as well as suitable organic solvents, are discussed in detail in the Weber article referenced above. For example, a commonly and widely used electrode for measuring the concentration of calcium ion consists of an inert porous plastic substrate saturated with a water immiscible organic solvent such as xylene or n-dodecyl alcohol or dioctyl phenyl phosphonate. Calcium bis-2 - diethyl hexyl phosphate is dissolved in the organic solvent in the conventional electrode. While this has been a satisfactory electrode for many purposes, its selectivity with respect to common interfering ions such as sodium and magnesium can leave a bit to be desired when very precise measurements are required. Additionally, its range can be somewhat limited and usually does not extend to calcium concentrations below $10^{-5}$ molar.

SUMMARY OF THE INVENTION

It is an object of this invention to provide an improved selective or specific ion electrode for measuring the concentration of calcium ions in aqueous solutions which overcomes many of the disadvantages of the prior art electrodes. It is an advantage of the electrode of the instant invention that it can measure calcium concentrations which are less than $10^{-5}$ molar and has a selectivity with respect to common interfering ions such as sodium and magnesium up to five times greater than the present calcium ion electrodes in general use.

Accordingly, the instant invention relates to an electrode for measuring the concentration of calcium ions in an aqueous solution comprising a substantially water immiscible, liquid organic phase containing an ion exchange material selected from the group consisting of calcium bis [para (1,1,3,3 tetramethyl butyl)-phenyl] phosphate, calcium bis (para-t-butyl phenyl) phosphate, bis [para (1,1,3,3, tetramethyl butyl)-phenyl]phosphoric acid, and bis (para-t-butyl phenyl) phosphoric acid. Means are provided for containing the organic phase and providing an interface for ion exchange contact between the organic phase and the aqueous solution and an internal reference electrode element is also provided in electrical contact with the organic phase.

Other objects and advantages of this invention will be apparent from the detailed description following.

DETAILED DESCRIPTION

In accordance with the instant invention a calcium ion electrode was prepared by placing a substrate or porous web or membrane over one end of an insulating glass tube. The substrate was a substantially chemically inert thin material such as cellophane, glass cloth, porous polyethylene or the like, all of which are conventionally used. Disposed in the tube in contact with the membrane or impregnated therein in some instances was a substantially water immiscible liquid organic phase containing an ion exchange material selected from the group consisting of calcium bis [para (1,1,3,3 tetramethyl butyl)-phenyl] phosphate, calcium bis (para-t-butyl phenyl) phosphate, bis [para (1,1,3,3 tetramethyl butyl)-phenyl] phosphoric acid, and bis (para-t-butyl phenyl) phosphoric acid. In the specific tests referred to hereafter the material used was calcium bis [para (1,1,3,3 tetramethyl butyl)-phenyl] phosphate which is normally solid and was dissolved in the inorganic solvent of the conventional type mentioned above. The organic phase thus also formed a solution of the ion to be measured in the tube. Immersed directly in the organic phase was a conventional silver-silver chloride internal reference electrode. A series of tests were then conducted measuring the calcium ion concentration in various solutions of known calcium chloride concentrations in mols per liter. Then a further series of tests in which known quantities of the common interfering ions, i.e. sodium as sodium chloride and magnesium as magnesium chloride were added to the solutions of known calcium chloride concentration. The results of all these tests are shown in Table I below.

TABLE I $CaCl_2$ solutions in moles/l.

| | $10^{-5}$ | | $10^{-4}$ | | $10^{-3}$ | | $10^{-2}$ | | $10^{-1}$ | $10^{-4}$ $CaCl_2$ 0.15 NaCl | | $10^{-3}$ $CaCl_2$ 0.15 NaCl | | $10^{-4}$ $CaCl_2$ $10^{-2}$ $MgCl_2$ | | $10^{-3}$ $CaCl_2$ $10^{-2}$ $MgCl_2$ |
|---|---|---|---|---|---|---|---|---|---|---|---|---|---|---|---|---|
| | Δ | | Δ | | Δ | | Δ | | | | | | | | | |
| Electrode: | | | | | | | | | | | | | | | | |
| 1 | −40 | 27 | −13 | 29 | +16 | 25 | +41 | 23 | +64 | −13 | 24 | +11 | | −5 | 18 | +13 |
| 2 | −32 | 27 | −5 | 31 | +26 | 26 | +52 | 24 | +76 | −5 | 23 | +18 | | +2 | 20 | +22 |
| 3 | −37 | 27 | −10 | 28 | +18 | 27 | +45 | 25 | +70 | −13 | 24 | +11 | | −4 | 19 | +15 |

The various test results give a selectivity coefficient for calcium to sodium about $1 \times 10^{-4}$ to $1 \times 10^{-2}$ and calcium to magnesium of about 1.3 to $1.9 \times 10^{-2}$. The resistance ranged from 2 to $4 \times 10^8$ ohms. An additional series of tests were run using calcium bis (para-t-butyl phenyl) phosphate as the ion exchange material. The results attained were comparable to those of Table I and are shown in Table II.

TABLE II $CaCl_2$ solutions in moles/l.

| $10^{-5}$ | $10^{-4}$ | $10^{-3}$ | $10^{-2}$ | $10^{-1}$ | $10^{-4}$ M $CaCl_2$ $10^{-1}$ $MgCl_2$ | $10^{-3}$ M $CaCl_2$ $10^{-1}$ $MgCl_2$ | $10^{-4}$ M $CaCl_2$ 0.5 M NaCl | $10^{-3}$ M $CaCl_2$ 0.5 M NaCl |
|---|---|---|---|---|---|---|---|---|
| Δ | Δ | Δ | Δ | | Δ | | Δ | |
| 61 mv. 25 | −36 mv. 28 | −8 mv. 28 | +20 mv. 25 | +45 mv. | −18 mv. 11 | −7 mv. | −36 mv. 23 | −13 mv. |
| −61 25 | −36 28 | −8 27 | +19 24 | +43 | −19 12 | +7 | −36 24 | −12 |
| −67 29 | −38 28 | −10 27 | +17 24 | +41 | −20 12 | −8 | −38 24 | −14 |

These values give a selectivity coefficient for $Ca^{++}/Na$ as $1.2 \times 10^{-4}$ and $Ca^{++}/Mg^{++}$ as $3 \times 10^{-2}$.

The normally liquid form of these ion exchange materials, i.e. bis [para (1,1,3,3 tetramethyl butyl)-phenyl] phosphoric acid, and bis (para-t-butyl phenyl) phosphoric acid, should also give results comparable to the above.

Thus from the above results it can be seen that the electrodes for measuring the concentration of calcium ions in an aqueous solution according to the instant invention offer at least one decade lower response than the known calcium electrodes as shown in the Weber article referenced above and a selectivity with respect to interfering ions such as sodium magnesium which is up to five times better than the conventional calcium electrodes.

It will be appreciated that the foregoing is a description of an exemplary embodiment of the instant invention. This is for illustrative purposes only and the instant invention is not to be limited thereby but only by the claims wherein what is claimed is:

1. An electrode for measuring the concentration of calcium ions in an aqueous solution comprising:
   (a) a substantially water immiscible, liquid organic phase containing an ion exchange material selected from the group consisting of calcium bis [1,1,3,3 tetramethyl butyl)-phenyl] phosphate, calcium bis (para-t-butyl phenyl) phosphate, bis [para 1,1,3,3 tetramethyl butyl)-phenyl] phosphoric acid, and bis (para-t-butyl phenyl) phosphoric acid;
   (b) means for containing the organic phase and providing an interface for ion exchange contact between the organic phase and the aqueous solution; and
   (c) an internal reference electrode element in electrical contact with the organic phase.
2. The electrode of claim 1 wherein the ion exchange material is normally solid and is dissolved in an organic solvent.
3. The electrode of claim 1 wherein the ion exchange material is normally liquid and is dissolved in an organic solvent.
4. The electrode of claim 1 wherein a porous substrate is associated with the containing means and the interface is formed at the substrate.

References Cited

UNITED STATES PATENTS 3,429,785  2/1969  Ross _____ 204—1 T

GERALD L. KAPLAN, Primary Examiner

U.S. Cl. X.R.

260—965